United States Patent [19]

Inoue et al.

[11] Patent Number: 4,742,092
[45] Date of Patent: May 3, 1988

[54] ORGANOPOLYSILOXANE COMPOSITION

[75] Inventors: Yoshio Inoue; Masatoshi Arai, both of Gunma, Japan

[73] Assignee: Shin-Etsu Chemical Co., Ltd., Tokyo, Japan

[21] Appl. No.: 918,775

[22] Filed: Oct. 14, 1986

[30] Foreign Application Priority Data

Oct. 24, 1985 [JP] Japan ................................. 60-238292

[51] Int. Cl.$^4$ ............................................. C08F 2/46
[52] U.S. Cl. ...................................... 522/27; 522/33;
522/40; 522/46; 522/48; 522/43; 522/47;
522/49; 522/53; 522/70; 522/63; 522/68;
522/65; 522/99; 522/172; 528/14; 528/15;
528/17; 528/18; 528/19; 528/21; 528/30;
528/32; 528/901
[58] Field of Search ............ 528/30, 32, 901, 14,
528/15, 17, 18, 19, 21; 522/27, 33, 40, 46, 48,
49, 47, 43, 53, 70, 63, 68, 65, 99, 172

[56] References Cited

U.S. PATENT DOCUMENTS 4,485,206 11/1984 Inoue et al. ......................... 525/477
4,579,636 4/1986 Inoue et al. ........................... 528/15

Primary Examiner—Melvyn I. Marquis
Attorney, Agent, or Firm—Jules E. Goldberg

[57] ABSTRACT

The curable organopolysiloxane composition of the invention is formulated with two kinds of crosslinking agents including an organosilane compound having 2 or 3 isopropenyloxy groups in a molecule and an organopolysiloxane having at least 2 mercapto groups in a molecule added to the base ingredient of a hydroxy-terminated diorganopolysiloxane together with a curing catalyst and a photosensitizer. The composition has two-way curability by the condensation reaction in the presence of atmospheric moisture between the silanolic hydroxy groups and the isopropenyloxy groups and by the ultraviolet-induced addition reaction between the isopropenyloxy groups and the mercapto groups to exhibit very reliable curing behavior giving a cured rubbery elastomer having excellent properties.

4 Claims, No Drawings

ORGANOPOLYSILOXANE COMPOSITION

BACKGROUND OF THE INVENTION

The present invention relates to an organopolysiloxane composition or, more particularly, to an organopolysiloxane composition curable by reacting with atmospheric moisture and by irradiating with ultraviolet light and useful as an adhesive or as a sealing agent.

Various kinds of curable organopolysiloxane compositions are known in the prior art including so-called room temperature-curable compositions having stability under a hermetically sealed condition but curable when exposed to the atmosphere containing moisture to be converted into a rubbery elastomer and ultraviolet-curable compositions having stability in dark but curable when irradiated with ultraviolet light to be converted into a rubbery elastomer. A variety of commercial products are available of these types of curable organopolysiloxane compositions and are used in a variety of applications.

A problem in the moisture-curable organopolysiloxane compositions is that, since the curing velocity of the composition depends on the diffusion of water vapor through the surface, curing of the composition cannot be so rapid as to convert a surface layer of a certain thickness into a rubbery elastomer within a short length of time of, for example, a few seconds so that the curable organopolysiloxane composition of this type is not suitable for use as an adhesive or sealing agent which is required to exhibit the desired adhesive or sealing effect within a short time.

A problem in the ultraviolet-curable organopolysiloxane composition is, on the other hand, that, although the composition is rapidly cured in the portion under direct exposure to ultraviolet light, curing can hardly proceed in the shade without direct exposure to ultraviolet or in a colored composition excepting the very surface layer. In particular, ultraviolet light cannot reach the core of a thick body of the composition which is left uncured excepting the surface layer.

It has been previously proposed that the above mentioned problem in the ultraviolet-curable organopolysiloxane composition can be at least partly solved when the composition is prepared by compounding a diorganopolysiloxane terminated at both molecular chain ends with siloanolic hydroxy groups as the base ingredient with a vinylsilane compound having a silicon-bonded vinyl group and a hydrolyzable group or a partial hydrolysis product thereof and a mercapto-containing organosilane compound having at least two mercapto groups in a molecule in combination so that the composition can be cured in two ways of the condensation reaction of the hydrolyzable groups with the atmospheric moisture in the shade of the ultraviolet light and the ultraviolet-induced addition reaction between the vinyl groups and the mercapto groups in the portion under direct exposure to ultraviolet. The improvement in the curing behavior of the organopolysiloxane composition mentioned above is still insufficient presumably due to the limited number of the vinyl groups. When a substantial amount of vinyl groups are introduced into the organopolysiloxane as the pendant groups of the polymeric molecules with an object to further improve the curing behavior of the composition, disadvantages are caused in the cured silicone rubber product in respect of the decrease in the elongation as a rubber and increase in the hardness.

SUMMARY OF THE INVENTION

The present invention accordingly has an object to provide a solution of the above described problems of the conventional curable organopolysiloxane compositions. The novel and improved curable organopolysiloxane composition of the invention comprises:

(a) 100 parts by weight of an organopolysiloxane having at least two silanolic hydroxy groups in a molecule;

(b) from 0.5 to 30 parts by weight of an isopropenyloxy-containing organosilane compound represented by the general formula $$R_a Si[O-C(CH_3)=CH_2]_b(OR)_c, \quad (I)$$

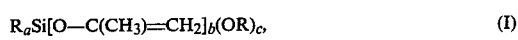

in which R is a substituted or unsubstituted monovalent hydrocarbon group free from aliphatic unsaturation having 1 to 8 carbon atoms, a is zero or 1, b is 2 or 3 and c is zero, 1 or 2 with the proviso that $a+b+c=4$, or a partial hydrolysis product thereof;

(c) a mercapto-containing organopolysiloxane compound having at least two mercapto groups in a molecule in an amount sufficient to provide from 0.1 to 20 mercapto groups per isopropenyloxy group in the component (b);

(d) from 0.01 to 10 parts by weight of a curing catalyst; and (e) from 0.01 to 10 parts by weight of a photosensitizer.

DETAILED DESCRIPTION OF THE PREFERRED EMBODIMENTS

As is described in the above given summary of the invention, the curable organopolysiloxane composition of the invention comprises a hydroxy-containing organopolysiloxane as the base ingredient, i.e. component (a), compounded with an isopropenyloxycontaining organosilane compound as the component (b) and a mercapto-containing organopolysiloxane compound as the component (c) to serve as a combined system of crosslinking agents by utilizing the two-way reactivity of the isopropenyloxy groups in the condensation reaction with atmospheric moisture and in the ultraviolet-induced addition reaction with the mercapto groups so that the organopolysiloxane composition is imparted with dual curing characteristics.

The component (a) as the base ingredient of the inventive curable organopolysiloxane composition is an organopolysiloxane having at least two silanolic hydroxy groups, i.e. hydroxy groups directly bonded to the silicon atoms, in a molecule. Although the molecular structure of the organopolysiloxane is not particularly limitative, it is preferably a diorganopolysiloxane having a linear structure terminated at both molecular chain ends each with a silanolic hydroxy group. The organic groups bonded to the silicon atoms of the diorganosiloxane units forming the polysiloxane chain are each a monovalent hydrocarbon group exemplified by alkyl groups, e.g. methyl, ethyl and propyl groups, alkenyl groups, e.g. vinyl and allyl groups, aryl groups, e.g. phenyl and tolyl groups, and cycloalkyl groups, e.g. cyclohexyl group, as well as those substituted hydrocarbon groups obtained by replacing a part or all of the hydrogen atoms in the above named hydrocarbon groups with substituent atoms and groups such as halogen atoms, cyano groups and the like. In particular, no mercapto groups should be contained as the substituents. The average degree of polymerization, i.e. the number of the silicon atoms forming the polysiloxane linkages in a molecule, of the diorganopolysiloxane should be at least 5 and the diorganopolysiloxane should have a viscosity in the range from 25 to 500,000 centistokes or, preferably, from 1000 to 100,000 centistokes at 25° C.

The component (b) in the inventive organopolysiloxane composition is an isopropenyloxy-containing organosilane compound represented by the above given general formula (I), in which the symbol R denotes a monovalent hydrocarbon group free from aliphatic unsaturation having 1 to 8 carbon atoms exemplified by alkyl groups, e.g. methyl, ethyl, propyl and butyl groups, aryl groups, e.g. phenyl and tolyl groups, and cycloalkyl groups, e.g. cyclohexyl group, as well as those substituted hydrocarbon groups obtained by replacing a part or all of the hydrogen atoms in the above named hydrocarbon groups with substituent atoms and groups such as halogen atoms, cyano groups and the like. The subscript a is zero or 1, b is 2 or 3 and c is zero, 1 or 2 with the proviso that a+b+c=4. Namely, the organosilane compound has 2 or 3 isopropenyloxy groups in a molecule, the remainder of the organic groups being unsaturation-free hydrocarbyl and/or hydrocarbyloxy groups. Partial hydrolysis products of the silane compound can be used in place of the silane compound per se.

Several of the examples of the isopropenyloxy-containing silane compound suitable as the component (b) include: methyl tri(isopropenyloxy) silane; phenyl tri(isopropenyloxy) silane; methyl di(isopropenyloxy) methoxy silane; methyl di(isopropenyloxy) n-propoxy silane; di(isopropenyloxy) dibutoxy silane and the like. These isopropenyloxy-containing organosilane compounds can be used either singly or as a combination of two kinds or more according to need.

The amount of the above described isopropenyloxy-containing organosilane compound in the inventive organopolysiloxane composition should be in the range from 0.5 to 30 parts by weight or, preferably, from 2 to 15 parts by weight per 100 parts by weight of the organopolysiloxane as the component (a). When the amount thereof is smaller than above, the extent of crosslink formation by the condensation reaction with atmospheric moisture would be insufficient so that the organopolysiloxane composition can hardly be converted into a fully cured rubbery elastomer. When the amount of the component (b) is too large, on the other hand, the cured composition would be imparted with an excessively high hardness due to the unduly increased density of crosslinks.

The component (c) is an organopolysiloxane having, in a molecule, at least two mercapto groups or, in particular, mercaptoalkyl groups bonded to the silicon atoms. The mercaptoalkyl group is preferably a 2-mercaptoethyl group or 3-mercaptopropyl group. This organopolysiloxane should be free of silanolic hydroxy groups. When the organopolysiloxane composition of the invention is irradiated with ultraviolet light, an addition reaction takes place between the mercapto groups of the component (c) and the isopropenyloxy groups of the component (b) to form crosslinks. The above mentioned ultraviolet-induced addition reaction proceeds so rapidly that the organopolysiloxane composition upon exposure to ultraviolet is imparted with a consistency increased to a gum-like condition to exhibit initial sealability.

The mercapto-containing organopolysiloxane compound as the component (c) may be an oligomeric organopolysiloxane having a cyclic molecular structure or a straightly linear diorgano-olysiloxane. Several examples of the mercapto-containing organopolysiloxane suitable as the component (c) include those compounds expressed by the following structural formulas, denoting methyl and phenyl groups with the symbols Me and Ph, respectively:

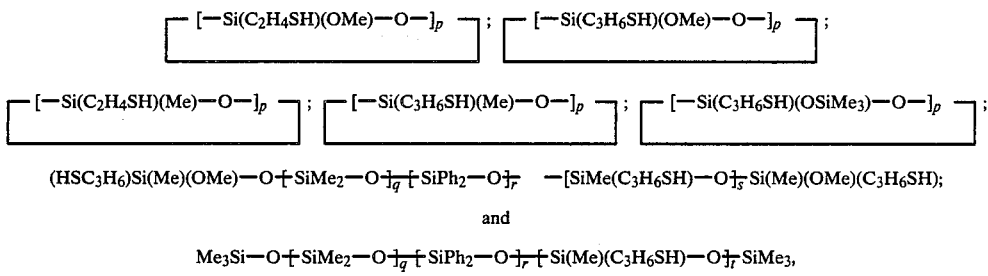

in which p is a positive integer of 3 to 8, q, r and s are each zero or a positive integer and t is a positive integer of 2 or larger. These mercapto-containing organopolysiloxane compounds can be used either singly or as a combination of two kinds or more according to need.

The amount of the mercapto-containing organopolysiloxane compound as the component (c) in the inventive organopolysiloxane composition should be in such a range that from 0.1 to 20 or, preferably, from 0.5 to 5 mercapto groups are provided per isopropenyloxy group in the component (b). When the amount thereof is too small, the initial increase in the consistency of the organopolysiloxane composition would be insufficient by the exposure to ultraviolet. When the amount of the component (c) is too large, on the other hand, the composition after curing would have an excessively high hardness as a rubbery elastomer.

The component (d) added to the inventive organopolysiloxane composition is a curing catalyst to promote the condensation reaction between the above described component (a) and (b) in the presence of atmospheric moisture to form crosslinks. Various kinds of known compounds can be used as the catalyst including metal salts of carboxylic acids, e.g. lead 2-ethylhexoate, dibutyltin diacetate, dibutyltin dilaurate, butyltin tri(2-ethylhexoate), iron 2-ethylhexoate, cobalt 2-ethylhexoate, manganese 2-ethylhexoate, zinc 2-ethylhexoate, tin (II) caprylate, tin naphthenate, tin oleate, tin butyrate, titanium naphthenate, zinc naphthenate, cobalt naphthenate and zinc stearate, organic titanate esters, e.g. tetrabutyl titanate, tetra(2-ethylhexyl) titanate, triethanolamine titanate and tetra(isopropenyloxy) titanate, organotitanium compounds, e.g. organotitanosiloxanes and titanium B-carbonyl, aluminum alkoxides, aminoalkyl-substituted alkoxy silanes, e.g. 3-aminopropyl triethoxy silane and N-(trimethoxysilylpropyl) ethylenediamine, amine compounds and salts thereof, e.g. hexylamine and dodecylamine phosphate, quaternary ammonium salts, e.g. benzyl triethyl ammonium acetate, lower carboxylic acid salts of alkali metals, e.g. potassium acetate, sodium acetate and lithium oxalate, dialkyl hydroxylamines, e.g. dimethyl hydroxylamine and diethyl hydroxylamine, 1,1,3,3-tetramethyl guanidine, and organosilicon compounds having a 1,1,3,3-tetramethyl guanidino group, e.g. 3-(tetramethylguanidino)propyl trimethoxy silane and 1,1,1,3,5,7,7,7-octamethyl-3,5-di(3-tetramethylguanidinopropyl) tetrasiloxane. These compounds as the curing catalyst can be used either singly or as a combination of two kinds or more according to need. Particularly preferable among the above named compounds as the curing catalyst are the guanidine compounds and the guanidino-containing organosilicon compounds in respect of the efficiency of promoting the crosslink formation by the condensation reaction as well as the activity thereof to increase adhesion of the cured composition to the substrate surface.

The amount of the curing catalyst as the component (d) in the inventive organopolysiloxane composition should be in the range from 0.01 to 10 parts by weight or, preferably, from 0.1 to 5 parts by weight per 100 parts by weight of the organopolysiloxane as the component (a). When the amount thereof is too small, the curing reaction would proceed taking a disadvantageously long time and the curing reaction cannot proceed with uniformity to the core portion of a thick body. When the amount of the curing catalyst is too large, on the other hand, the time taken for surface filming of the composition would be extremely short to cause some inconvenience in respect of the workability with the composition in addition to the disadvantages caused in the properties of the cured composition such as poor heat resistance and weatherability.

The component (e) added to the inventive organopolysiloxane composition is a photosensitizer to promote the ultraviolet-induced addition reaction between the isopropenyloxy groups of the component (c) and the mercapto groups of the component (c) to form crosslinks. Various compounds are known in the art as an ultraviolet photosensitizer including acetophenone, propiophenone, benzophenone, xanthone, fluorene, benzaldehyde, anthraquinone, triphenyl amine, carbazole, 3-methyl acetophenone, 4-methyl acetophenone, 3-pentyl acetophenone, 4-methoxy acetophenone, 3-bromoacetophenone, 4-allyl acetophenone, 1,4-diacetyl benzene, 3-methoxy benzophenone, 4-methyl benzophenone, 4-chlorobenzophenone, 4,4'-dimethoxy benzophenone, 4-chloro-4'-benzyl benzophenone, 3-chloroxanthone, 3,9-dichloroxanthone, 3-chloro-8-nonyl xanthone, benzoin, benzoin methyl ether, benzoin butyl ether, bis(4-di-methylaminophenyl) ketone, benzyl methoxy ketal, 2-chlorothioxanthone and the like. The amount of the photosensitizer as the component (e) in the inventive composition may be relatively small, for example, in the range from 0.01 to 10 parts by weight per 100 parts by weight of the organopolysiloxane as the component (a) because the composition is fully curable even with a relatively low degree of photosensitization. The amount of the photosensitizer is usually in the range from 0.1 to 5 parts by weight per 100 parts by weight of the component (a) to give a sufficient effect of photosensitization.

It is optional that the inventive organopolysiloxane comprising the above described components (a) to (e) is further admixed with a filler inan object to impart improved mechanical properties to the rubbery elastomer obtained by curing the composition. Suitable fillers are exemplified by fumed silica, precipitated silica, fumed titanium dioxide, calcium carbonate, diatomaceous earth, calcium silicate and the like. These inorganic fillers may be subjected to a hydrophobic treatment beforehand using an organochlorosilane, organopolysiloxane, hexamethyl disilazane and the like. The amount of the filler added to the inventive composition should preferably be limited not to exceed 300 parts by weight per 100 parts by weight of the organopolysiloxane as the component (a) since a composition loaded with an excessively large amount of the filler may lose flowability to have poor workability in addition to the problem due to the unduly increased elastic modulus of the rubbery elastomer obtained by curing the composition.

The curable organopolysiloxane composition of the invention can be obtained by merely mixing the above described components (a) to (e) together with other optional additives each in a calculated and weighed amount in a dry atmosphere into a uniform blend. The composition has dual curability by the condensation reaction in the presence of atmospheric moisture and by the addition reaction under ultraviolet irradiation so that the composition is useful not only in the applications as an adhesive, sealing material, FIPG material and the like but also in the applications in which rapid curing is essential at least in the surface layer without requiring such a high curing velocity in the portion below the surface layer as in surface-releasable coating materials, electrical insulating materials, coating materials of electric circuit boards, encapsulating materials for electronic devices, coating materials of planographic printing plates, coating materials of fabrics and the like. The dual curability of the composition capable of exhibiting remarkable increase in the consistency within a few seconds by ultraviolet irradiation is particularly advantageous in the application as a FIPG material of automobiles in which rapid appearance of sealability of the composition is sometimes desired by the increase of consistency or curing of the composition in a portion having a relatively large clearance in order to prevent the uncured composition from being pushed out by the internal pressure. If desired, the inventive organopolysiloxane composition of the invention may be dissolved in or diluted with an organic solvent when it is used as a coating material or primer.

The above mentioned optional additives, besides the filler, used with an object to improve or modify the properties of the composition either before or after curing include coloring agents, heat- and cold-resistance improvers, thixotropy modifiera, dehydrating agents, flame retardants, oil resistance improvers, adhesion aids and the like each used in a limited amount.

In the following, the curable organopolysiloxane composition of the invention is described in more detail by way of examples, in which the expression of "parts" always refers to "parts by weight" and the values of viscosity are all those obtained by the measurement at 25° C.

EXAMPLE 1

A curable organopolysiloxane composition was prepared by uniformly blending 100 parts of a diorganopolysiloxane having a viscosity of 30,800 centistokes and composed of 95 % by moles of diemthylsiloxane units and 5 % by moles of diphenylsiloxane units with silanolic hydroxy groups at the molecular chain ends, 13 parts of a fumed silica filler after a hydrophobic treatment with a silane compound, 3.0 parts of methyl tri(isopropenyloxy) silane, 0.5 part of 3-tetramethylguanidinopropyl trimethoxy silane, 5.0 parts of a mercapto-containing organopolysiloxane having a viscosity of 35 centistokes and expressed by the formula

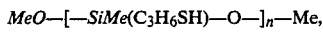

MeO—[—SiMe($C_3H_6$SH)—O—]$_n$—Me, and 0.5 part of benzophenone.

The organopolysiloxane composition was shaped into a sheet of 120 mm by 120 mm wide and 2 mm thick, which was irradiated with ultraviolet light to give a dose of 30 Cal/cm$^2$ so that the sheet was found to have been cured to a depth of 1.6 mm from the surface facing the ultraviolet lamp. When this partially cured sheet was kept for 48 hours in an atmosphere of 55 % relative humidity at 23° C., it was cured to give a fully cured rubber sheet of which the mechanical properties were measured to give a hardness, JIS, of 25, ultimate elongation of 250 % and tensile strength of 16 kg/cm$^2$.

EXAMPLE 2

A curable organopolysiloxane composition was prepared by uniformly blending 100 parts of a diorganopolysiloxane having a viscosity of 221,000 centistokes and composed of 95 % by moles of diemthylsiloxane units and 5 % by moles of diphenylsiloxane units with silanolic hydroxy groups at the molecular chain ends, 13 parts of the same silane-treated fumed silica filler as used in Example 1, 3.0 parts of methyl tri(isopropenyloxy) silane, 0.5 part of 3-tetramethyl-guanidinopropyl trimethoxy silane, 1.0 part of 1,3,5,7,9-penta(3-mercaptopropyl)-1,3,5,7,9-penta(trimethylsiloxy) cyclopentasiloxane having a viscosity of 50 centistokes and 0.5 part of diethoxy acetophenone.

This organopolysiloxane composition was shaped into three sheets of each 120 mm by 120 mm wide and 2 mm thick and the sheets were cured into rubber sheets under different conditions of curing. Thus, the sheet No. 1 was cured by irradiating with ultraviolet light in the same manner as in Example 1 to give a dose of 30 Cal/cm$^2$, the sheet No. 2 was cured by merely keeping for 48 hours in an atmosphere of 55% relative humidity at 23° C. and the sheet No. 3 was cured by first irradiating with ultraviolet light to give a dose of 10 Cal/cm$^2$ followed by keeping for 48 hours in the same atmosphere as for the sheet No. 2. The mechanical properties of these cured rubber sheets were as shown in Table 1 below.

TABLE 1

| Rubber sheet No. | 1 | 2 | 3 |
|---|---|---|---|
| Hardness, JIS | 20 | 29 | 35 |
| Ultimate elongation, % | 110 | 320 | 220 |
| Tensile strength, kg/cm$^2$ | 5 | 14 | 15 |

What is claimed is:

1. A curable organopolysiloxane composition which comprises:
   (a) 100 parts by weight of an organopolysiloxane having at least two silanolic hydroxy groups in a molecule;
   (b) from 0.5 to 30 parts by weight of an isopropenyloxy-containing organosilane compound represented by the general formula

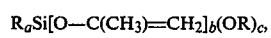

$R_a$Si[O—C($CH_3$)=$CH_2$]$_b$(OR)$_c$, in which R is a substituted or unsubstituted monovalent hydrocarbon group free from aliphatic unsaturation having 1 to 8 carbon atoms, a is zero or 1, b is 2 or 3 and c is zero, 1 or 2 with the proviso that a+b+c=4, or a partial hydrolysis product thereof;
   (c) a mercapto-containing organopolysiloxane compound having at least two mercapto groups in a molecule in an amount sufficient to provide from 0.1 to 20 mercapto groups per isopropenyloxy group in the component (b);
   (d) from 0.01 to 10 parts by weight of a curing catalyst; and
   (e) from 0.01 to 10 parts by weight of a photosensitizer.

2. The curable organopolysiloxane composition as claimed in claim 1 wherein the organopolysiloxane as the component (a) is a diorganopolysiloxane terminated at both molecular chain ends each with a silanolic hydroxy group and having a viscosity in the range from 25 to 500,000 centistokes at 25° C.

3. The curable organopolysiloxane composition as claimed in claim 1 wherein the isopropenyloxy-containing organosilane compound as the component (b) is selected from the class consisting of methyl tri(isopropenyloxy) silane, phenyl tri(isopropenyloxy) silane, methyl di(isopropenyloxy) methoxy silane, methyl di(isopropenyloxy) propoxy silane and di(isopropenyloxy) dibutoxy silane.

4. The curable organopolysiloxane composition as claimed in claim 1 wherein the mercapto group in the mercapto-containing organopolysiloxane as the component (c) is bonded to the silicon atom in the form of a 2-mercaptoethyl group or 3-mercaptopropyl group.

* * * * *